United States Patent [19]
Bennett et al.

[11] Patent Number: 5,664,186
[45] Date of Patent: Sep. 2, 1997

[54] COMPUTER FILE MANAGEMENT AND BACKUP SYSTEM

[75] Inventors: Robert Bradley Bennett, Endwell; Robert Michael Nugent, Nichols; James Michael Showalter, Endicott, all of N.Y.

[73] Assignee: International Business Machines Corporation, Armonk, N.Y.

[21] Appl. No.: 436,783

[22] Filed: May 8, 1995

Related U.S. Application Data

[63] Continuation of Ser. No. 886,206, May 21, 1992, abandoned.

[51] Int. Cl.$^6$ .................................................. G06F 17/30
[52] U.S. Cl. ............................. 395/620; 711/162
[58] Field of Search .......................... 395/489, 620, 395/618, 619

[56] References Cited

U.S. PATENT DOCUMENTS

| | | | |
|---|---|---|---|
| 4,020,466 | 4/1977 | Cordi et al. | 395/617 |
| 4,084,231 | 4/1978 | Capozzi et al. | 395/444 |
| 4,507,751 | 3/1985 | Gawlick et al. | 395/618 |
| 4,819,156 | 4/1989 | DeLorme et al. | 395/182.13 |
| 4,855,907 | 8/1989 | Ferro et al. | 395/620 |
| 4,959,774 | 9/1990 | Davis | 395/182.04 |
| 4,962,459 | 10/1990 | Mallozzi et al. | 364/464.02 |
| 5,008,786 | 4/1991 | Thatte | 395/489 |
| 5,043,871 | 8/1991 | Nishigaki et al. | 395/618 |
| 5,043,876 | 8/1991 | Terry | 364/200 |
| 5,088,026 | 2/1992 | Bozman et al. | 395/403 |
| 5,175,849 | 12/1992 | Schneider | 395/618 |
| 5,261,069 | 11/1993 | Wilkinson et al. | 395/425 |
| 5,263,154 | 11/1993 | Eastridge et al. | 395/575 |
| 5,367,698 | 11/1994 | Webber et al. | 395/800 |
| 5,379,398 | 1/1995 | Cohn et al. | 395/481 |
| 5,379,412 | 1/1995 | Eastridge et al. | 395/250 |

FOREIGN PATENT DOCUMENTS

| | | |
|---|---|---|
| 0114190 | 9/1983 | European Pat. Off. |
| 237539 | 10/1987 | Japan |

OTHER PUBLICATIONS

IBM TDB vol. 28, No. 10, Mar. 1986, "Integrated Concurrency And Shared Buffer Coherency Control For Multi–Systems", by D. M. Dias et al.

IBM TDB vol. 34, No. 3, Aug., 1991, "Recovery Of Data Pages After Partial Page Writes", by G. R. Bullock, et al.

*Central Point PC Tools Hard Disk Back Up* 1991, pp. 20, 21, 69, Central Point Software, Inc.®.

Rees, D. and Stonebraker M. "Effects Of Locking Granularity In A Database Management System" ACM Transactions On Database Systems, vol. 2, No. 3, Sep. 1977 pp. 233–246.

"*Central Point PC Tools Hard Disk Back Up*", pp. 11–15, 1991, Additional Pages To Previously Cited Book.

*Primary Examiner*—Thomas G. Black
*Assistant Examiner*—Jack M. Choules
*Attorney, Agent, or Firm*—Arthur J. Samodovitz

[57] ABSTRACT

A file management and backup system manages access to data objects such as records stored in a primary repository, and occasionally backs-up the data objects to a backup repository. A backup utility within the system, periodically or at the request of a user, makes a backup request to a file manager, and specifies the scope of the backup. In response, the file manager makes an entry in a "backup in progress" table indicating that the corresponding file space(s), directory(ies), file(s) and/or data object(s) are currently involved in a consistent backup procedure. Then, the backup utility commences the actual copying of the data within the backup scope to the backup repository with assistance from the file manager in accessing the data from the primary repository. If a request is made to update a file space, directory, file or data object within the backup scope once the entry is made in the backup in progress table, the file manager makes a "shadow" or copy of the file space, directory, file or data object for which update is requested. Then, the file manager updates the original file space, directory, file or data object, and uses the shadow copy for the backup procedure. After the backup is completed, the shadow copy is invalidated. If the update request is made during the backup procedure to a directory, file or data object which has already been backed-up, then a shadow copy is not necessary.

24 Claims, 8 Drawing Sheets

| Update Application Request | Backup Utility Request | File Manager Action | Object and Shadow Status | Backup File Output Device Driver |
|---|---|---|---|---|
| | | | 98<br>(Initial state)<br>D102: F121<br>F121: 107, 112, 104<br>O: 107, 112, 104<br>SO: | |
| 200<br>Issues requests to add F123 to D102 with objects 116, 109. | | 202<br>Creates F123<br>Adds F123 to D102. Creates objects 116, 109 | 204<br>D102: F121, F123<br>F121: 107, 112, 104<br>F123: 116, 109<br>O: 107, 112, 104, 116, 109<br>SO: | |
| | 205<br>Issues request to open output backup file | | No Change | 206<br>Initializes output backup file device |
| | 207<br>Issues request to start consistent read shadowing for scope D102 | 208<br>Determines if consistent read in progress for D102. If so, return error. If not, initiate consistent read for scope D102. Locks D102. Marks D102 to identify consistent read is in process. Unlocks D102. | No Change | |
| 212<br>Issues requests to add F122 with object 111 to D102 | | 214<br>Determines that shadow D102 does not exist.<br>*Create shadow D102*.<br>Create Object 111.<br>Add file F122 to D102. | 215<br>D102: F121, F122, F123<br>D102': F121, F123<br>F121: 107, 112, 104<br>F122: 111<br>F123: 116, 109<br>O: 107, 112, 104, 116, 109, 111<br>SO: | |

| Update Application Request | Backup Utility Request | File Manager Action | Object and Shadow Status | Backup File Output Device Driver |
|---|---|---|---|---|
| | 219 Issues request to Open D102 for backup | 220 Determines that shadow D102' exists. Reads content of D102'. | No Change | |
| | 222 Issues request to read first D102 entry | 224 Returns D102' entry F121 | No Change | |
| | 225 Issues request to write D102 entry F121 to backup file | | No Change | 226 Writes D102' data for F121 |
| | 228 Issues request to open F121 for backup | 230 Prepares to read F121 | No Change | |
| 232 Issue request that adds object 136 to F121 | | 234 Determine that F121' does not exist. *Creates shadow F121'. Creates object 136. Adds object 136 to F121. Updates D102' to reflect F121'. | 236 D102: F121, F122, F123 D102': F121', F123 F121: 107, 112, 104, 136 F121': 107, 112, 104 F122: 111 F123: 116, 109 O: 107, 112, 104, 116, 109, 111, 136 SO: | |
| | 238 Issues request to read F121 | 240 Determines the F121' now exists. Returns F121' objects 107, 112 | No Change | |
| | 242 Issues request to write F121 objects 107, 112 to backup file | | No Change | 244 Writes F121' objects 107, 112 |

| Update Application Request | Backup Utility Request | File Manager Action | Object and Shadow Status | Backup File Output Device Driver |
|---|---|---|---|---|
| 250 Issues request to update F121 object 104 | | 252 *Creates shadow object 104'. Updates object 104 Updates F121' to reflect 104' | 254 D102: F121, F122, F123 D102': F121', F123 F121: 107, 112, 104, 136 F121': 107, 112, 104' F122: 111 F123: 116, 109 O: 107, 112, 104, 116, 109, 111, 136 SO: 104' | |
| | 260 Issues next request to read F121 | 262 Determines next F121' object. Returns object 104'. | No Change | |
| | 264 Issues request to write F121 object 104 to backup file | | No Change | 266 Writes F121' object 104' |
| | 270 Issues request to close F121 | 272 Closes F121' (If shadow for this file then erase these shadows) | 274 D102: F121, F122, F123 D102': F121', F123 F121: 107, 112, 104, 136 F121': 107, 112, 104' F122: 111 F123: 116, 109 O: 107, 112, 104, 116, 109, 111, 136 SO: 104' | |
| | 280 Issues request to read next D102 entry | 282 Returns D102' data for F123 entry | No Change | |
| | 284 Issues request to write D102 data for F123 to backup file | | No Change | 286 Writes D102' Data for F123 |

| Update Application Request | Backup Utility Request | File Manager Action | Object and Shadow Status | Backup File Output Device Driver |
|---|---|---|---|---|
| | 290 Issues request to Open F123 for backup | 292 Determines that F123' does not exist Prepares to read F123 | No Change | |
| 300 Issues request to update F121 object 112 | | 302 Determines that shadow F121' already exists * If it does not exist, create shadow 112' Updates F121' to reflect 112'. Updates object 112 | 304 D102: F121, F122, F123 D102': F121', F123 F121: 107, 112, 104, 136 F121': 107, 112', 104' F122: 111 F123: 116, 109 O: 107, 112, 104, 116, 109, 111, 136 SO: 104', 112' | |
| | 310 Issues first request to read F123 | 312 Returns F123 object 116 | No Change | |
| | 314 Issues request to write F123 object 116 to backup file | | No Change | 316 Writes F123 object 116 |
| 320 Issues requests to delete F123 from D102 | | 322 Determines D102' already exists * Creates shadow F123'. Defines objects 116, 109 as shadow objects 116', 109'. Deletes F123 from D102. Updates D102' to reflect F123' | 324 D102: F121, F122 D102': F121', F123' F121: 107, 112, 104, 136 F121': 107, 112', 104' F122: 111 F123: 116', 109' O: 107, 112, 104, 111, 136 SO: 104', 112', 116', 109' | |
| | 330 Issues next request to read F123 | 332 Determines F123' now exists. Determines that shadow 109' exists for next object. Returns object 109' | No Change | |

| Update Application Request | Backup Utility Request | File Manager Action | Object and Shadow Status | Backup File Output Device Driver |
|---|---|---|---|---|
| | 334 Issues request to write F123 object 109 to backup file | | No Change | 336 Writes F123' object 109' to output device |
| | 340 Issues request to close F123 | 342 Closes F123' (If shadows for this file then erase these shadows) | 344 D102: F121, F122 D102': F121', F123 F121: 107, 112, 104, 136 F121': 107, 112', 104' F122: 111 F123: 116', 109' O: 107, 112, 104, 111, 136 SO: 104', 112', 116', 109' | |
| 350 Issues requests to update object 104 in F121. | | 352 Determines that shadow F121' exists. Determines that shadow 104' already exists. Updates object 104 | No Change | |
| | 360 Issues request Close D102 to end backup read | 362 Ends D102' read processing | No Change | |
| | 370 Issues request to stop consistent read for D102 | 372 Stops consistent read for D102'. Deletes shadows D102', F121', F123', 104', 112', 116', 109' | 374 D102: F121, F122 F121: 107, 112, 104, 136 F122: 111 O: 107, 112, 104, 111, 136 SO: | |
| | 376 Issues request Close backup file | | No Change | 378 Completes output device processing |

| Update Application Request | Backup Utility Request | File Manager Action | Object and Shadow Status | Backup File Output Device Driver |
|---|---|---|---|---|
| 380 Issues requests delete F122 from D102 | | 382 Determines that D102 is not included in the scope of any in process consistent read shadowing. Deletes F122 and object 111. Updates D102 | 384 D102: F121 F121: 107, 112, 104, 136 O: 107, 112, 104, 136 SO: | |

FIG. 3

COMPUTER FILE MANAGEMENT AND BACKUP SYSTEM

The application is a continuation, of application Ser. No. 07/886,206, filed May 21, 1992 now abandoned.

BACKGROUND OF THE INVENTION

The invention relates generally to computer systems, and deals more particularly with a computer system for managing access to files in a primary repository and backing-up the files to a backup repository.

Many computer systems include a file manager program and a backup program or utility. The file manager program controls storage of files (or other data) in a primary repository and manages requests by application programs to access the stored files. In a shared file system, the file manager permits multiple application programs to access the same file. The primary repository may take the form of a set of direct access storage device (DASD) disks, and data for a single file may reside on one or more of these DASD disks. The backup utility has the responsibility to backup or copy the files from the primary repository to the backup repository to safeguard the files from logical or physical damage. The backup repository may take the form of a magnetic tape.

The backup procedure often requires a substantial amount of time, minutes or even hours, to copy the data to the backup repository, depending on the amount of data to be copied and the operating speed of the storage device. A previously known file manager activates a lock on the files during the backup period to prevent any application program from updating the files. This is important to ensure that the backed-up files are "consistent" i.e. represent a "snap shot" of a set of files at the point in time when the backup began. After the backup is complete, the lock is deactivated. While this approach provides consistency, it causes delays to any application program which requires write access to the files during the backup period. Another previously known file manager permits any application program to update the files during the backup period. This approach creates no delays to the application programs but risks inconsistency in the backup copy.

A previously known Unix Plan 9 file manager operates as follows to backup a file directory. All the files are stored on disk and initially referenced by a first directory. At a predetermined time, such as five o'clock PM every day, all directories (but not the files) are backed-up, i.e. a second directory is defined which points to the same files as the first directory. This is the extent of the backup procedure.

The Unix Plan 9 also maintains a historical copy of each file in the following manner. Whenever a request is made to update a file in the first directory, the file is opened and a copy or shadow of each file is made without the update to serve as a historical copy. This requires time and DASD storage. The first directory continues to point to the original file and the second directory is made to point to the "historical" shadow file. Then, the update is made to the files corresponding to the first directory, and the updated file is closed. During the update period (which is short because the update is made to another location on the same disk and not to tape), any application program can access the historical shadow copy of the file via the second directory.

Another previously known file manager permits application programs to update files while the files are being backed-up and ensures a consistent backup copy. This file manager operates as follows. When a backup is initiated, the file manager writes a copy of all the files to be backed-up to tape. During the backup period, any application program can update the copy. After the backup is complete, the file manager scans the primary file repository directory to determine if any updates were made to the files that were backed up. If so, the file manager again backs-up the updated files to tape. This process is repeated a finite number of times or until a scan reveals no new updates. This technique is inefficient because it always requires a complete copy of the files to be backed-up and may require repeated reading of the primary file repository and multiple file backups to the backup repository if updates occur during the backup procedure.

A previously known IBM VM/SP 6 operating system and associated file manager operate as follows to provide a consistent view of data objects within a file stored in DASD and permit other application programs to update the data objects while the file is being read. When each file is opened for reading, the file manager makes a copy of all pointers from the file to all data objects within the file. Then, the reader (application program) proceeds to read the data objects. If another application program requests an update to one of the data objects during the reading process, then the file manager copies the data objects for which update is requested into RAM, and this other application program makes the updates to the copy in RAM and requests that the updates be committed. Then, the file manager writes the updated copy to a new location in DASD, and one set of pointers on DASD is changed to point to the new location. While this technique is effective in providing consistent reading and updating by other application programs, this technique requires copying of each pointer to each data object within the file which is opened for reading, and there can be thousands of data objects and respective pointers in each file. Also, this technique is limited to providing consistency at the file level only.

A general object of the present invention is to provide a file management and backup system which permits application programs to update a file while the file is being backed-up, yet provides a consistent backup copy and minimizes overhead associated with the backup and the storage required in memory (RAM) and the primary repository.

Another object of the present invention is to provide a file management and backup system of the foregoing type which minimizes overhead and memory burden when only one file of a set or one data object in a file is updated during backup of the entire file set or entire file, respectively.

SUMMARY OF THE INVENTION

The invention resides in a file management and backup system which manages storage of and access to data objects such as records or pages or blocks of data in a primary repository, and occasionally backs-up the data objects to a backup repository. The data object records can be grouped into files, the files grouped into directories and the directories grouped into file spaces to form a hierarchy. A backup utility within the system, periodically or at the request of a user, makes a backup request to a file manager. The backup utility can also specify the scope of the backup as being all or part of the hierarchy such as one or more named files and all the data objects within the named files, one or more named directories and all the files and data objects within the named directories, or one or more named files spaces and all the directories within the named file space(s) and all the files and data objects within the directories.

In response to the backup request and specified backup scope, the file manager makes an entry in a "backup in progress" table indicating that the corresponding file space(s), directory(ies), file(s) and/or data object(s) are currently involved in a consistent backup procedure. Then, the backup utility commences the actual copying of the data within the backup scope to the backup repository with assistance from the file manager in accessing the data from the primary repository. If a request is made to update a file space, directory, file or data object within the backup scope once the entry is made in the backup in progress table (and before the backup is completed), the file manager makes a "shadow" or copy of the file space, directory, file or data object for which update is requested. Then, the file manager updates the original file space, directory, file or data object, and uses the shadow copy for the backup procedure. Thus, the backup copy is consistent, and application programs have access to the most recent updated version of file space(s), directory(ies), file(s) and/or data object(s) within the backup scope during the period of backup. Also, a minimum amount of copies is required (only those which are being updated), and a minimum overhead is required by the file manager to make the entry in the backup in progress table, read the table for each subsequent update request and make the shadow copies when necessary.

According to an optimization feature of the present invention, if the update request is made during the backup procedure to a directory, file or data object which has already been backed-up, then a shadow copy is not necessary.

BRIEF DESCRIPTION OF THE FIGURES

FIGS. 2 a–f form a flow chart illustrating the operation of the file management and backup system of FIG. 1.

DETAILED DESCRIPTION OF THE PREFERRED EMBODIMENTS

Figure 1:
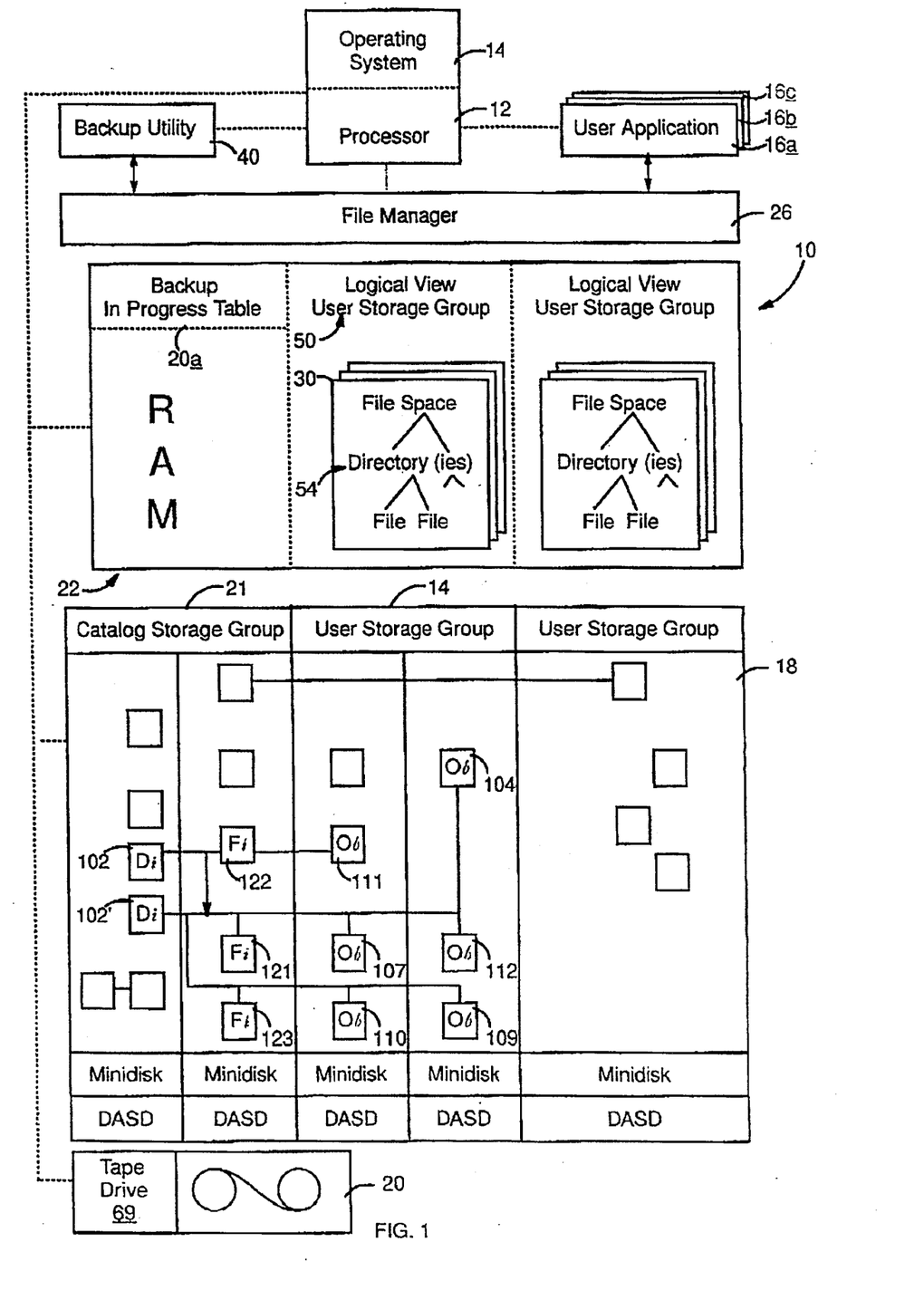
FIG. 1 is a block diagram of a computer system which includes a file management and backup system according to the present invention.

Referring now to the figures in detail wherein like reference numerals indicate like elements throughout the several views, FIG. 1 illustrates a computer system generally designated 10 which includes a previously known processor 12, operating system 14, user application programs 16a,b,c, primary or working repository 18, and a backup repository 20. Computer system 10 also includes a file manager or server 26 and a backup application or utility 40 according to the present invention. The present invention does not require or depend on any particular type of processor or operating system, and can be used in a main frame (virtual machine or nonvirtual machine) computer, workstation or a personal computer. By way of example, computer system 10 exclusive of the present invention is provided by an IBM System/370 or System/390 computer system with an ES/9000 processor and a VM/ESA (R) operating system. The following document is available from International Business Machines Corp. at Mechanicsburg, Pa., and provides background information about the System/370 and System/390 computer systems and the VM/ESA operating system, exclusive of the present invention: VM/ESA General Information GC24-5550 and referenced VM/ESA publications.

The foregoing IBM computer systems provide a shared file system in which the user application programs 16a,b,c all can read from and/or write to any of the files. For example, the files can include documents or records, and the application programs can read, create, update or erase the documents or records, the latter three accesses being considered "write" accesses. The files are physically stored in the primary repository 18, which by way of example, is a direct access storage device (DASD), i.e. magnetic disk. Each file has two parts, the actual data which is stored in a user storage group 19 and catalog information which is stored in a catalog storage group 21. The catalog information comprises the directories (including the names of the files in each directory) and directory attributes, pointers to the files in the user storage group, file access authority, file characteristics, and date of last update to each file. The catalog storage group resides on multiple minidisks, each of which minidisks being considered a virtual DASD extent. The user storage groups 19 also reside on multiple minidisks, each of which minidisks also being considered a virtual DASD extent. For example, a directory 102' is represented by catalog information "Di" stored in the catalog storage group 21. The catalog information references files 121 and 123. File 121 is represented by catalog information "Fi" stored in the catalog storage group 21 and File 123 is represented by catalog information "Fi" stored in the catalog storage group 21. File 121 comprises data objects 107, 112 and 104 stored in the user storage group 19, and file 123 comprises data objects 116 and 109 stored in the user storage group 19.

A file manager 26 (in accordance with the prior art VM/ESA operating system) creates a "logical" hierarchical view of the directories and files for viewing by the application programs 16a,b,c. The directories are grouped into file spaces such as file space 30 with each file space containing all the directories, files, and/or data objects for a user. File spaces are grouped into user storage groups such as user storage group 50 with each user storage group containing all the file spaces for a respective user group.

When an application program 16a,b,c, or a user of the application program desires to access a file, the user selects the appropriate file space, directory, and file and specifies the updates. If the user specifies an update to a data object, then the data object is copied into RAM 22 for access by the file manager. After the file manager completes the updates, the associated application program issues a command to commit the updates. Pursuant to this command, the file manager copies the updated file or data object from RAM 22 to the primary repository 18. A backup application or utility periodically or at the request of a user (of the backup utility) initiates and controls a backup or copying of the directory and file catalog information and data objects (within the scope of the backup) from the primary repository 18 to the backup repository 20. The backup utility determines the scope of the backup through backup invocation options.

The following describes the basic function of file manager 26 and backup utility 40 according to the present invention to permit any of the application programs 16a,b,c to access (i.e. read or update) files during the time when the files are being backed-up from the primary repository 18 to the backup repository 20. Either a user operating the backup utility or a timer, initiates the backup procedure with a specified scope such as a user storage group 50, a file space 30, or a directory 54. After initiation, the backup utility notifies the file manager of the scope of the backup. In response, the file manager 26 places a comprehensive lock on the user storage group 50 and "marks" the user storage group, file space or directory as "backup in progress". Then, the file manager removes the lock. Even though the aforesaid lock is comprehensive and thereby prevents the completion or commitment of other start backup operations and all updates for the user storage group, the duration of the lock is very short and therefore, causes a negligible decrease in the efficiency of the computer system and the associated application programs.

Next, the backup utility begins to copy the files within the scope of the backup from the primary repository 18 to the backup repository 20 by fetching the data from the primary repository (with assistance from the file manager) and supplying the data (via RAM 22) to a controller such as tape drive 69 for the backup repository. This backup procedure can take minutes or hours depending on the amount of data requiring the backup and the speed of writing to the backup repository. If any of the application programs 16a,b,c requests read access to any directory or file within the scope of the backup before the backup is completed, then the file manager copies the file into RAM 22 (in the same manner as if backup were not occurring) and permits the application program to read it. Because this is only a read access, no additional steps are required. However, if any of the application programs 16a,b,c, requests update or change access to any directory, file or data object within the scope of the backup before the backup is completed, the file manager 26 makes a shadow copy in another location in the primary repository of the directory, file or data object which is being updated or changed, and directs the backup utility to use the shadow copy as the source for copying to the backup repository. This ensures consistency in the backup copy. (However, according to an optional optimization, the shadow copy is not made if the subject has already been copied to the backup repository, even though the entire backup procedure has not yet been completed.) Then, the file manager copies the original directory, file or data object into RAM 22 for change by the requesting application program 16a,b,c. After the change by the application program and a request by the application program to commit the updates, the file manager commits these changes to the original directory, file or data object in the primary repository. After the backup is completed, the shadow copy of the directory, file or data object is either erased or released because it is no longer valid. It should be noted that in accordance with the objects of the present invention, the requesting application program 16 has immediate and unlimited access to any directory, file or data object being backed-up (except for the brief marking period), the primary repository 18 was not burdened with the shadow copy unless and until the application program made the update request during the time of backup, the shadow copy was limited to only those directories, files and/or data objects that were updated during the period of backup, and the backup proceeds while the application program 16 accesses the file being backed-up. The lock placed on the directories, files and/or data objects within the scope of the backup is very short lived, surviving only long enough to mark the scope of the backup in RAM 22.

FIGS. 2a–f and the following provide a more detailed description of the operation of the file manager 26 and backup utility 40 according to the present invention. The operation is described for various types of accesses to directories, files and data objects within the backup scope. In FIGS. 2a–f events proceed from left to right in each row beginning with the first row and then continue down to the next row. In this example, initially file space 30 comprises a directory 102 referencing a file 121 (status 98). At this time, there are no shadow copies (in the primary repository) of the directory 102, file 121 or any of the data objects 107, 112 or 104.

Figure 2A:
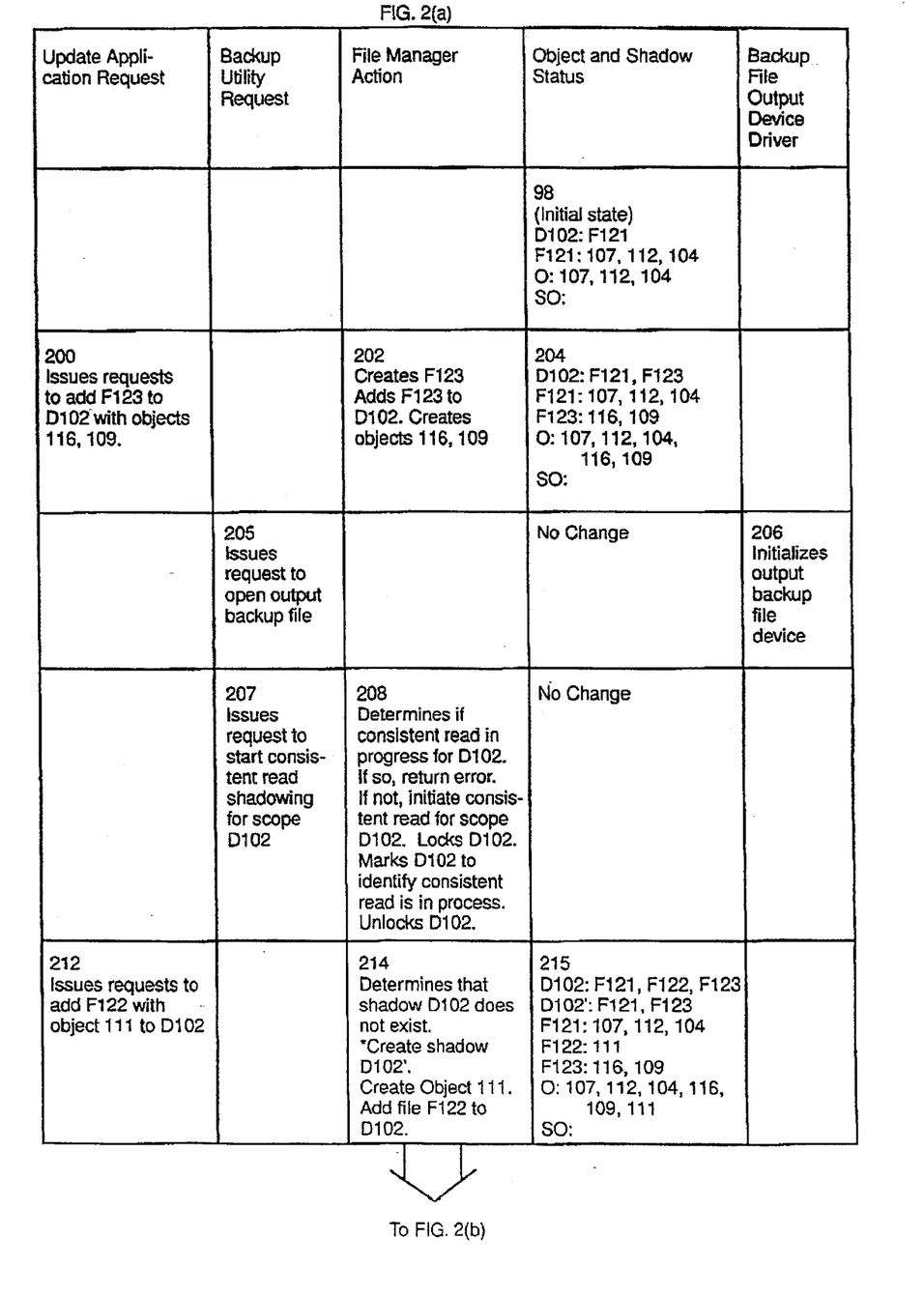

In step 200, one of the application programs 16a,b, or c makes a request to the file manager 26 to create a new file 123 in directory 102. At this time, there is no backup in progress. Also in step 200, application program 16a,b, or c writes the contents of file 123, i.e. data objects 116 and 109, into RAM 22, and issues a command to file manager 26 to commit the update. In response, file manager 26 creates file 123 in directory 102 by copying the data objects 116 and 109 from RAM 22 into the user storage group 19 and by updating the associated catalog information into the catalog storage group 21 of primary repository 18 (step 202). Status block 204 illustrates the current state of directory 102. At this time also, file space 30 comprises directory 102 which contains files 121 and 123 and the associated data objects.

Subsequently, in step 205 the backup utility issues a request to tape controller 19 to open an output backup file. In response, the tape controller 19 builds the requisite control blocks and commands the tape drive hardware to initialize for output (step 206). Next, the backup utility 40 issues a request to the file manager 26 to participate in a consistent backup procedure with the scope of the backup being directory 102, which implicitly includes all files associated with directory 102 and all data objects within these files (step 207). File manager 26 has kept track of all previous backup requests that are still in progress and the scope of each. The file manager 26 locks the backup in progress table 209 in RAM 22. If any previous backup request is still in progress that includes directory 102, then the file manager 26 replies to the backup utility with a rejection to the backup request of step 207, and the backup procedure concludes without copying directory 102 or any associated files or data objects to the backup repository (step 208). However, if directory 102 is not included in a previous backup request that is still in progress, then file manager 26 places a lock on directory 102 (step 208). This directory 102 lock implicitly locks all files referenced by directory 102, and all data objects within these files to temporarily prevent all access to directory 102, the files referenced by directory 102 and all data objects within these files (step 208). After the lock is in place, file manager "marks" directory 102, and implicitly all files referenced by directory 102 and all data objects within these files as "backup in progress", and then releases the locks (step 208). This "mark" comprises an entry in a backup in progress table 209 for directory D102 in RAM 22. The scope of the backup established in step 207 also defines the backup hierarchy. Subsequent file manager 26 processing will maintain in RAM 22 the current position of the backup processing relative to this hierarchy. Immediately after releasing the lock, the file manager notifies the backup utility. The backup utility can now proceed with the backup process step 219 described below.

Figure 2B:
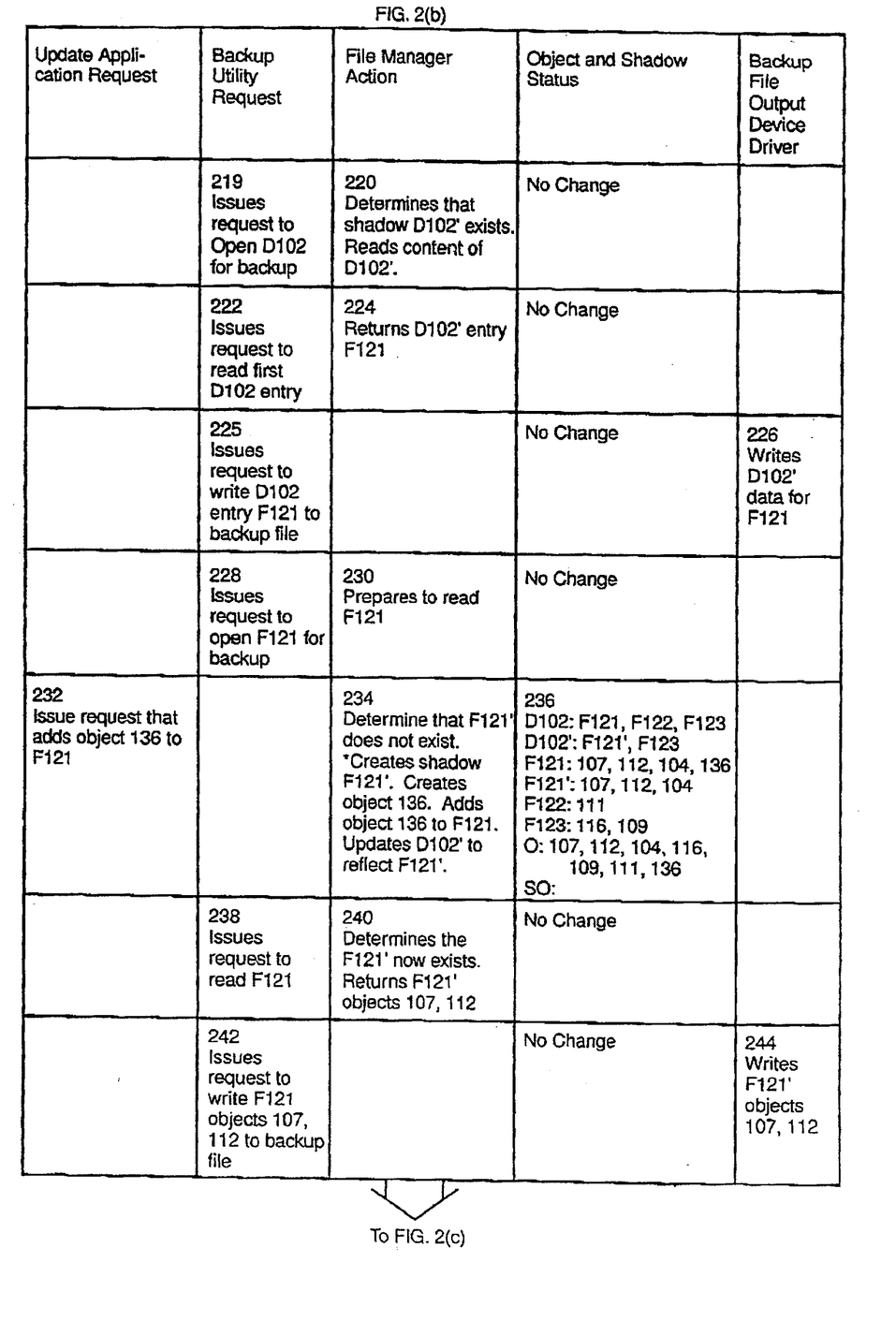

However, in the illustrated example, before backup utility 40 executes step 219, application program 16a,b, or c issues a request to create a new file 122 and reference new file 122 under directory 102 (step 212). Then, the requesting application program writes the contents of file 122, i.e. data object 111, into RAM 22, and requests that the update be committed. In step 214, file manager 26 determines from inspection of table 209 that directory 102 is currently marked "backup in progress". Because application program 16a,b, or c is making a request to update directory 102 (with the reference to new file 122), and there is not yet a shadow copy of directory 102, file manager 26 creates a shadow copy (D102') of directory 102. The backup utility is transparently notified that the shadow copy of directory 102 should be backed-up instead of the original copy when the directory D102 is opened for backup in step 219.

It should be noted that because neither file 121 nor 123 is being updated, but rather file 122 is being added to directory 102, it is not necessary to make a shadow copy of file 121 or 123 or the data objects 107, 112, 104, 116 and 109 within files 121 and 123. The one copy of each of the files 121 and 123 and data objects 107, 112, 104, 116, and 109 is sufficient at this time. This minimizes processing and use of RAM 22 by the file manager 26. Also in step 214, the file manager creates file 122 and data object 111 by changing the catalog information for directory 102 and file 122 in the catalog storage group 21 and copying the data object 111 from RAM 22 into the user storage group 19. At this time (state 215), the most recent updated level of directory 102 contains file 121, file 123 and file 122, and the shadow copy of directory 102 contains files 121 and 123, which constituted the contents of directory 102 before the most recent update. There is only one physical copy in primary repository 18 of each of the files 121, 123 and 122 and data objects 107, 112, 104, 116, 109, and 111. Status 215 is also illustrated figuratively in the primary repository 18 of FIG. 1.

The shadow copy of directory 102 is identified as D102' in state 215. D102' represents the state of directory 102 when the backup was initiated (step 207). D102' is then shown as occupying catalog storage group 21 space in the primary repository 18. Other file manager 26 implementation options allow the shadow copy of catalog storage group 21 data to be kept in RAM 22.

Figure 2C:
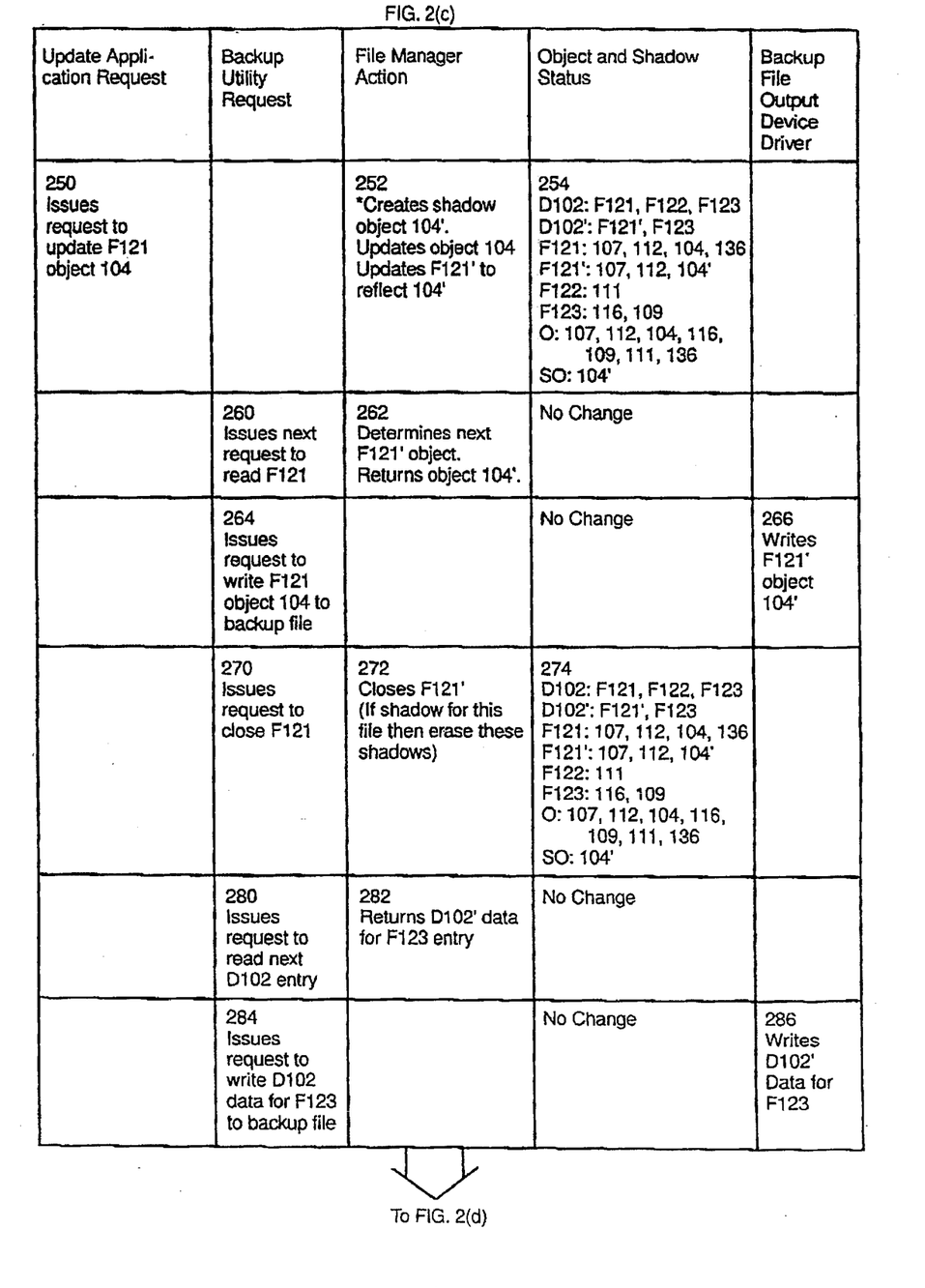
Figure 2D:
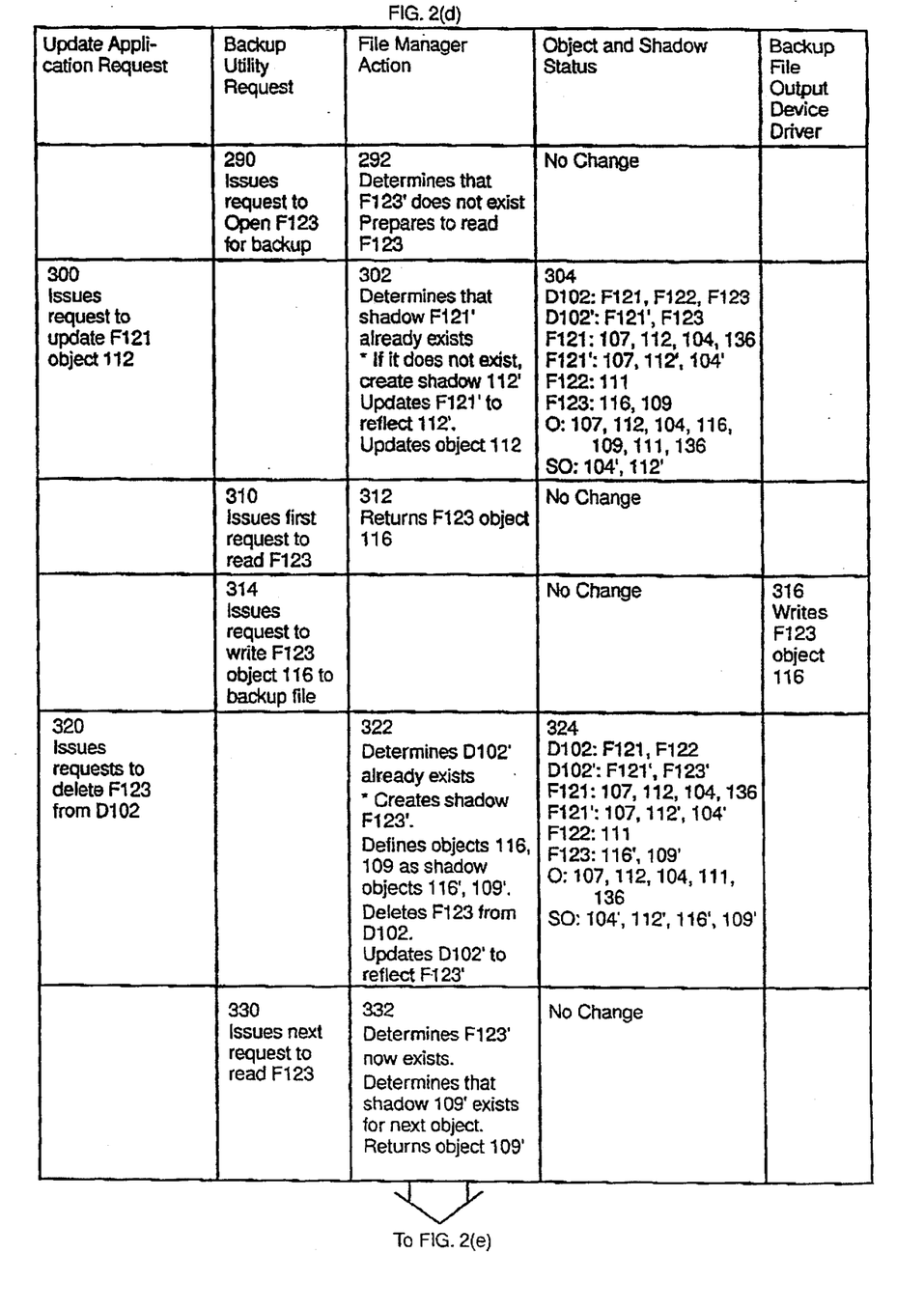
Figure 2E:
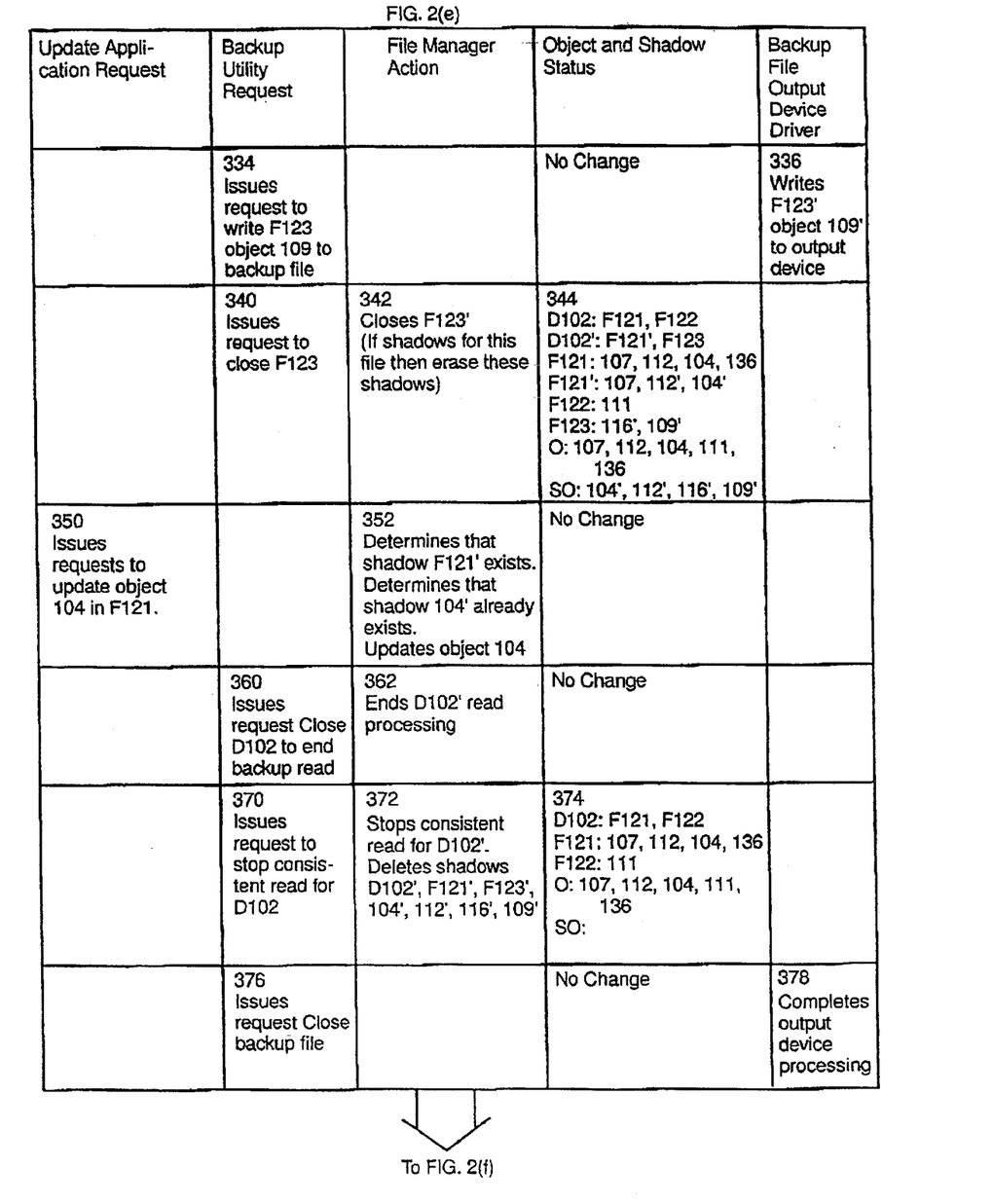
Figure 2F:
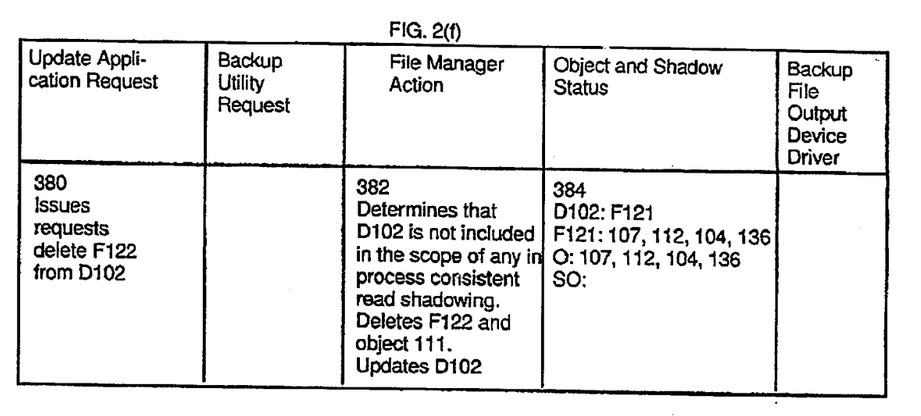
Figure 3:
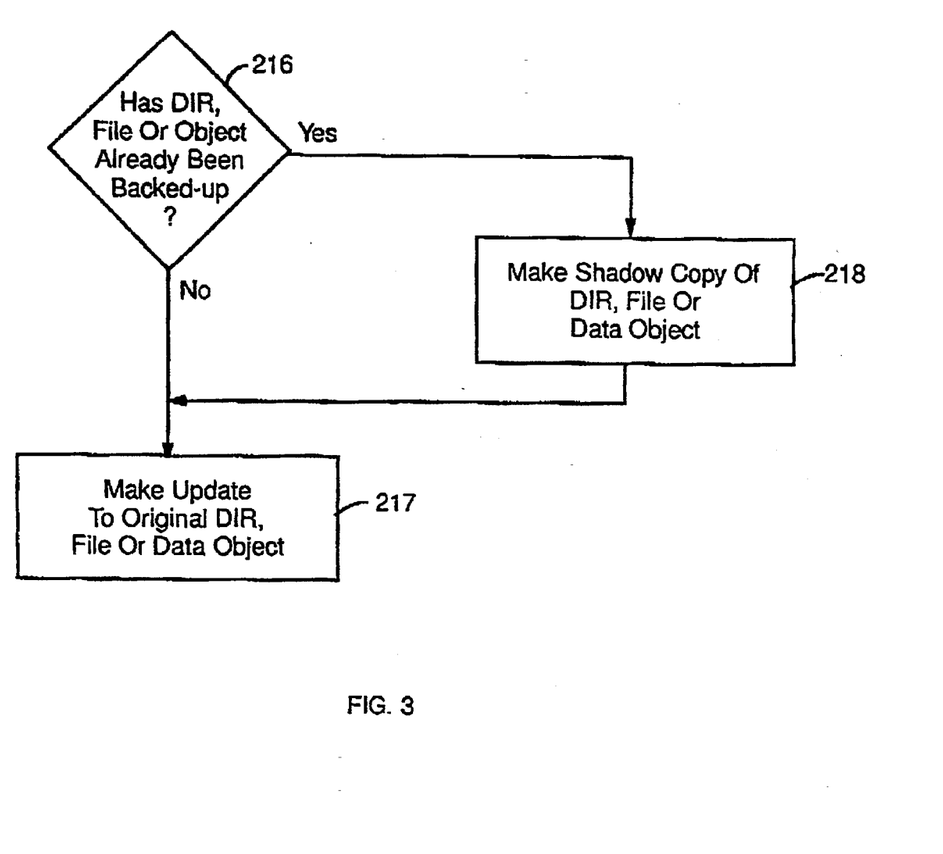
FIG. 3 is a flow chart illustrating an optimization technique that can be incorporated into the file management and backup system of FIG. 1.

FIG. 3 illustrates an optimization procedure which can be included in step 214 of the file manager 26. Before the file manager 26 creates the shadow copy of directory 102, the file manager determines if directory 102 has already been copied into the backup repository pursuant to the backup procedure initiated in step 207 (decision 216). This determination is made by comparing the current position of the backup processing in the back up hierarchy to the position in the hierarchy of the directory being updated. If directory 102 has already been copied to back up (decision 216), then the file manager does not need to make a shadow copy of directory 102, and the original directory 102 is updated (step 217) because the updates will not be copied into the backup repository. However, if the directory has not yet been copied to the backup repository, which is the illustrated example, then the file manager makes the shadow copy of directory 102 (step 218) as described above and then updates the original (step 217). This optimization procedure can be used before file manager creates a shadow copy of any directory, file or data object, and such instances are indicated by asterisks (*) in the flow chart of FIGS. 2a–f.

As noted above, the shadow copy of directory 102 is being used in the backup to backup repository 20. In step 219, the backup utility continues with the backup procedure by issuing to the file manager a command to open directory 102 for backup. In response, the file manager determines that the shadow copy of directory 102 exists, and reads the contents of the shadow copy of directory 102 (step 220). Next, the backup utility issues to the file manager a command to read the first entry in directory 102 (step 222), and the file manager complies by reading file 121 catalog information into RAM 22 (step 224). Next, the backup utility reads the entry, file 121, from RAM 22 and issues a request to the tape controller 19 to write file 121 catalog information as an entry for directory 102 (step 225), and the tape controller complies (step 226). Next, the backup utility issues a request to file manager 26 to open file 121 for backup (step 228). In response, file manager 26 determines that there is no shadow copy of file 121 (such a shadow copy was not necessary because file 121 was not updated in step 212), and prepares to read the original file 121 by initializing read control blocks in RAM 22 (step 230).

Immediately after step 230, application program 16a,b, or c issues a request to file manager 26 to update file 121 by adding a data object 136 thereto, writes the data object to RAM 22 and then requests that this update be committed (step 232). In response, file manager 26 determines that presently there is no shadow copy of file 121, and creates data object 136 by copying the data object 136 to primary repository 18 but does not yet add this data object 136 to file 121 (step 234). The file manager first makes a shadow copy 121' of file 121, updates shadow D102' to reflect shadow F121', and then adds the new data object 136 to the latest updated level of file 121. Thus, the backup can continue with the consistent shadow copy of file 121 (the shadow copy does not include the new data object 136) while the latest updated level of file 121 has been updated with data object 136. The state of the directory 102 and associated files and data objects is illustrated in status 236.

In step 238, the backup utility continues with the backup procedure by issuing to the file manager a request to read data objects for file 121 into a finite number of buffers in RAM 22. In response, the file manager determines that the shadow copy of file 121 now exists so that the shadow copy 121' should be the subject of the backup. Consequently, the file manager reads data objects for shadow file 121' into RAM 22 for the backup utility (step 240). Due to the finite number of the buffers specified for the read request, the file manager only fetches data objects 107 and 112. Data object 104 is not fetched because data object 104 does not fit into the specified buffers, even though data object 104 is part of shadow file 121'. Data object 136 is not fetched because data object 136 is not part of shadow file 121'. Next, the backup utility issues a request to the tape controller to write data objects 107 and 112 of file 121 to the tape (step 242), and the tape controller complies (step 244).

In step 250, application program 16a,b, or c issues a request to the file manager to update data object 104 in file 121, file manager 26 reads file 121 and data object 104 into RAM 22, the application program makes the update in RAM 22, and then the application program requests that the update be committed. Then, file manager 26 determines from the backup in progress table 209 that consistent backup is in progress for directory 102 and therefore, for file 121, shadow copy 121' of file 121 exists, but there is no shadow copy of data object 104 (step 252). Consequently, the file manager 26 logically creates shadow object 104' by copying the updated data object 104 from RAM 22 to another location in user storage group 19 in the primary repository 18; and then updating the catalog storage group 21 entry for file 121 to point to the new primary repository 18 location for the updated data object 104. The original version of data object 104 that existed when the backup started (step 207) becomes the shadow data object 104'. Shadow copy 121' for file 121 already identifies this data object. The current state of the directory 102 and associated files and data objects is illustrated in status 254.

In step 260, the backup utility issues a request to file manager 26 for the next block of file 121, and in response, file manager 26 determines that consistent backup is in progress for file 121, shadow file 121' exists, the next data object in shadow file 121' is data object 104, and there is a shadow copy 104' of data object 104. Consequently, the file manager reads the shadow copy 104' into RAM 22 for the backup utility (step 262). Then, the backup utility issues a request to the tape controller to write data object 104 to the tape (step 264), and the tape controller complies (step 266). It should be noted that the backup utility is never aware of the existance of any shadow copies, and backs up whatever the file manager provides in RAM in response to the backup utility's read request in step 260.

In step 270, the backup utility issues a request to file manger 26 to close file 121 because the backup is now complete for this file (but not directory 102'), and in response (step 272), file manager 26 closes shadow file 121' by releasing the read control blocks constructed in RAM 22 (step 230). NOTE: At this point, another type of optimization could erase or otherwise invalidate shadow file 121' to conserve RAM and primary repository. The current state of directory 102 and associated files and data objects is illustrated in status 274. Next, the backup utility issues a request to the file manager to read the next entry in directory 102 (step 280), and the file manager responds by examining shadow directory 102' and reading the catalog entry for file 123 into RAM 22 for the backup application (step 282). Then, the backup utility issues a request to the tape controller to write catalog data for file 123 to the tape (step 284), and the tape controller complies (step 286). Next, the backup utility issues a request to file manager 26 to open file 123 for backup (step 290), and the file manager determines that there is no shadow copy of file 123 and prepares to read file 123 (step 292).

Immediately after step 292, application 16a,b or c issues a request to file manager 26 to update data object 112 in file 121, file manager 26 copies data object 112 into RAM 22, and the application program updates the data object 112 in RAM 22 and requests that the update be committed (step 300). In response, file manager 26 determines that a consistent backup is in progress for directory 102 and file 121, and shadow copy 121' exists but there is no shadow copy of data object 112 (step 302). Then, the file manager 26 logically creates shadow copy 112' of data object 112 (without the updates of step 300) by copying the updates from RAM 22 into a new storage group 19 primary repository 18 location for data object 112 and updating the catalog storage group 21 entry for file 121 to point to the new location for data object 112 (step 302). The current state of directory 102 and the associated files and data objects is illustrated in status 304.

In step 310, the backup utility issues a request to the file manager to write the first block of file 123 into RAM 22, and in response, file manager 26 writes data object 116 into RAM 22 for the backup utility (step 312). File manager 26 does not fetch data object 109 at this time because data object 109 will not fit in the request buffers. Then, the backup utility issues a request to the tape controller to write data object 116 to tape (step 314), and the tape controller complies (step 316).

In step 320, application program 16a,b or c issues a request to file manager 26 to delete file 123 from directory 102, and in response, file manager 26 determines that consistent backup is in progress for directory 102 and the associated files and data objects, and a shadow copy 102' of directory 102 exists (step 322). Then, file manager 26 deletes the reference to file 123 from the original directory 102, creates a shadow copy 123' of file 123 for use in the backup procedure, and logically creates shadow copies 116' and 109' of data objects 116 and 109 (step 322). The original data objects 116 and 109 become shadow objects 116' and 109' because they are now referenced only by shadow copy 123' for file 123. The current state of directory 102 and associated files and data objects is illustrated in status 324.

In step 330, the backup utility issues a request to the file manager to read the next block of file 123, and in response, file manager 26 determines that shadow copy 123' of file 123 and shadow copy 109' of data object 109 now exist (step 332). Consequently, file manager 26 writes shadow data object 109' into RAM 22 (step 332). Then, the backup utility issues a request to the tape controller to write data object 109 to tape (step 334), and the tape controller complies (step 336). Then, the backup utility issues a request to the file manager to close file 123 (step 340), and in response, file manager closes file 123 which is now shadow file 123, (step 342). The current state of directory 102 and associated files and data objects is illustrated in status 344.

Immediately after step 342, application program 16a,b, or c issues a request to file manager 26 to update data object 104 in file 121, file manager 26 copies data object into RAM 22, the application program makes the update in RAM 22, and the application program requests that the update be committed (step 350). In response to the request, file manager 26 also determines that a consistent backup is in progress for directory 102 and for file 121 and data object 104, and shadow file 121' and shadow data object 104' already exists (step 352). Since there is no need to create additional shadows, the file manager 26 updates original data object 104 by copying the updated version from RAM 22 into the primary repository (step 352).

In step 360, the backup utility issues a request to the file manager to close directory 102 and thereby to end the copying stage of the consistent backup procedure for directory 102. In response, file manager 26 terminates the read processing of directory 102' by releasing the buffers acquired when the directory was opened (step 362). Next, the backup utility issues a request to the file manager to cease shadowing for directory 102 and all associated files and data objects (step 370). In response, the file manager momentarily places a comprehensive lock on directory 102 and all associated files and data objects, removes the "backup in progress" marker from the backup in progress table 209 for directory 102 and all associated files and data objects, and then releases the lock (step 372). Also, in step 372, the file manager deletes the shadow directory 102', shadow files 121' and 123', and shadow data objects 104', 112', 116' and 109' because the shadow copies were only kept for the consistent backup procedure and the shadow copies do not now contain the latest version of the directory 102 and associated files and data objects. The current state of the directory 102 and associated files and data objects is illustrated in status 374. Then, the backup utility issues a request to the tape controller to close the backup file (step 376), and the tape controller complies by completing the writing to the tape of any data or control information supplied by the file manager into RAM 22 but not yet written and writing a tape mark "end of file" (step 378).

The following describes a subsequent operation of the file manager 26 after the foregoing backup procedure has been completed and when no other backup procedure is in progress. After the foregoing backup procedure was completed in step 378, application program 16a,b or c issues a request to file manager 26 to delete file 122 from directory 102 (step 380). In response, file manager 26 determines from the backup in progress table 209 that directory 102 is not now included in the scope of any consistent backup procedure and simply deletes file 122 and data object 111 which constitutes the data in file 122 (step 382). Then, file manager 26 updates the catalog information for directory 102 by deleting file 122 from the list of files referenced by directory 102 (step 382). It should be noted that because there is no consistent backup in progress, step 382 was implemented without making any shadow copies. The current state of directory 102 and the associated files and data objects is illustrated in status 384.

Based on the foregoing, a file management and backup system according to the present invention has been disclosed. However, numerous modifications and substitutions can be made without deviating from the scope of the present invention. For example, if desired the backup can be made to another type of secondary repository such as another DASD. Therefore, the present invention has been disclosed by way of illustration and not limitation and reference should be made to the following claims to determine the scope of the present invention.

We claim:

1. A method for managing files listed in a directory, said method comprising the following steps performed in whole or part by a digital computer:

receiving a backup request with scope of said directory, and in response, locking said directory, then setting an indicator for said directory and then unlocking said directory;

receiving a request to change a specified file, and in response, determining that said specified file is listed in said directory and said indicator is set for said directory, making a copy of said specified file, making said change either to said specified file or said copy thereof; and after the unlocking step, copying to a backup repository said directory and files including said specified file or said copy thereof which has not been changed but excluding said specified file or said copy thereof which has been changed, and then resetting said indicator.

2. A method as set forth in claim 1 wherein, pursuant to said change request, no copy is made of the files for which change has not been requested.

3. A method as set forth in claim 1 further comprising the steps of making another, subsequent request to backup said directory, and in response, subsequently copying to said backup repository said specified file or copy thereof which was changed in place of said specified file or copy thereof which was not changed.

4. A method as set forth in claim 1 wherein said directory was created and used for accessing said specified file before said backup request was made.

5. A method as set forth in claim 1 wherein said copy of said specified file is made only if said indicator is set and said request to change said specified file occurs before said specified file has been copied to said backup repository.

6. A method as set forth in claim 1 further comprising the steps of:

receiving a request to delete one of said files; and if said indicator is set when said request is made to delete said one file, making a copy of said directory, and copying to said backup repository said directory and said files including said one file, and deleting from said directory copy an entry for said one file.

7. A method as set forth in claim 1 wherein said lock is set for a minimum time required to set said indicator.

8. A method as set forth in claim 1 wherein the files are stored on disk before backup, and said backup repository is a magnetic tape.

9. A method as set forth in claim 1 further comprising the step of generating and storing a logical, hierarchical view comprising said directory, said files descending from said directory and records descending from said files.

10. A method as set forth in claim 1 wherein:

said directory lists a plurality of files, one of said files being stored on two different disks along with other files listed in other directories; and said backup request does not encompass any of said other files.

11. A method as set forth in claim 1 wherein:

a disk stores said specified file and at least one other file which is not listed in said directory; and said backup request does not encompass said other file.

12. A method as set forth in claim 1 further comprising the following step which is implemented after said specified file or said copy thereof has been changed:

erasing or invalidating said specified file or said copy thereof which has not been changed after said specified file or copy thereof which has not been changed is copied to said backup repository, whereby said specified file or said copy thereof which has been changed is then an only accessible representation of said specified file outside of said backup repository.

13. A method as set forth in claim 12 wherein said specified file or said copy thereof which has not been changed is erased or invalidated after all of said files are copied to said backup repository.

14. A method as set forth in claim 1 wherein if said indicator is set when said change request is made and said specified file has already been copied to said backup repository, further comprising the step of making said change to said specified file without making a copy of said specified file.

15. A method as set forth in claim 1 wherein said indicator is a single bit.

16. A computer system for managing files listed in a directory, said computer system comprising:

means for receiving a backup request with scope of said directory;

means, responsive to said request, for locking said directory, then setting an indicator for said directory and then unlocking said directory; means for receiving a request to update a specified file;

means, responsive to the update request, for determining that said specified file is listed in said directory and said indicator is set for said directory, making a copy of said specified file and updating said specified file or copy thereof; and means, active after said directory is unlocked, for copying to a backup repository said directory and said files including said specified file or said copy thereof which has not been changed but excluding said specified file or copy thereof which has been changed, and then resetting said indicator.

17. A system as set forth in claim 16 wherein, pursuant to said update request, no copy is made of the files for which update has not been requested.

18. A system as set forth in claim 16 wherein the copy making means makes said copy of said specified file only if said request to update said specified file occurs before said specified file has been copied to said backup repository.

19. A system as set forth in claim 16 wherein the locking and unlocking means locks said directory for a minimum time required to set said indicator.

20. A system as set forth in claim 16 further comprising means for erasing or invalidating said specified file or said copy thereof which has not been changed, after the other of said specified file or said copy thereof has been changed and said specified file or said copy thereof which has not been changed is copied to said backup repository, whereby said specified file or said copy thereof which has been changed is then an only accessible representation of said specified file outside of said backup repository.

21. A system as set forth in claim 16 wherein said indicator is a single bit.

22. A method as set forth in claim 16 wherein:

said directory lists a plurality of files, one of said files being stored on two different disks along with other files listed in other directories; and said backup request does not encompass any of said other files.

23. A method as set forth in claim 16 wherein:

a disk stores said specified file and at least one other file which is not listed in said directory; and said backup request does not encompass said other file.

24. A method as set forth in claim 16 wherein said directory was created and used for accessing said specified file before said backup request was made.

* * * * *